United States Patent
Chini et al.

(10) Patent No.: US 8,433,017 B2
(45) Date of Patent: Apr. 30, 2013

(54) SYSTEM AND METHOD FOR TRANSMIT SIGNAL PULSE SHAPING IN AUTOMOTIVE APPLICATIONS

(75) Inventors: Ahmad Chini, Mission Viejo, CA (US); Seyed Hamidi, Milpitas, CA (US); Mehmet Tazebay, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 67 days.

(21) Appl. No.: 13/159,358

(22) Filed: Jun. 13, 2011

(65) Prior Publication Data
US 2012/0314780 A1    Dec. 13, 2012

(51) Int. Cl.
*H03K 7/02*    (2006.01)

(52) U.S. Cl.
USPC ........... 375/353; 375/237; 375/238; 375/340; 375/219; 370/474; 370/467

(58) Field of Classification Search .................. 375/353, 375/343, 219, 340, 350
See application file for complete search history.

(56) References Cited

U.S. PATENT DOCUMENTS

| | | | |
|---|---|---|---|
| 7,164,694 B1 * | 1/2007 | Nodoushani et al. | ......... 370/467 |
| 7,808,249 B1 | 10/2010 | Lo et al. | |
| 2009/0222678 A1 | 9/2009 | Yu et al. | |
| 2010/0215129 A1 * | 8/2010 | Conte | ............................ 375/340 |
| 2011/0028182 A1 * | 2/2011 | Trachewsky et al. | ...... 455/552.1 |
| 2011/0138259 A1 * | 6/2011 | Tan et al. | ........................ 714/792 |
| 2011/0150155 A1 * | 6/2011 | Pirooz et al. | ................... 375/350 |
| 2011/0182583 A1 * | 7/2011 | Rakib | .............................. 398/67 |
| 2011/0228822 A1 * | 9/2011 | Nieto et al. | .................... 375/219 |
| 2012/0219017 A1 * | 8/2012 | Zhang et al. | .................... 370/474 |

FOREIGN PATENT DOCUMENTS
EP    1786158 A1    5/2007

OTHER PUBLICATIONS

European Search Report, Jul. 2012.
Vehicles, boats and internal combustion engines—Radio disturbance characteristics—limits and methods of measurements for the protection of on-board receivers (IEC CISPR/D/344/CDV), Mar. 2007.
BMW Group Standard, GS 95002, Oct. 2004.

* cited by examiner

*Primary Examiner* — Eva Puente
(74) *Attorney, Agent, or Firm* — Duane S. Kobayashi

(57) ABSTRACT

A system and method for transmit signal pulse shaping in automotive applications. Automotive vehicle manufacturers that incorporate electronic components into an automotive vehicle must consider emission requirements masks that can be dependent on particular geographic markets as well as the other electronic components contained within a particular automotive vehicle design. A physical layer device is provided that can be configured to operate in multiple emissions configurations using configurable parameters specified for the modulation and wave shaping modules.

13 Claims, 5 Drawing Sheets

SYSTEM AND METHOD FOR TRANSMIT SIGNAL PULSE SHAPING IN AUTOMOTIVE APPLICATIONS

BACKGROUND

1. Field of the Invention

The present invention relates generally to pulse shaping and, more particularly, to a system and method for transmit signal pulse shaping in automotive applications.

2. Introduction

Automotive vehicles have become increasingly complex, incorporating dramatically increasing amounts of electronics content. This trend is expected to continue into the foreseeable future as automotive vehicles incorporate and interoperate with a variety of electronic devices. For example, automotive vehicles have incorporated increasing numbers of electronic control units (ECU) for the operation of the automotive vehicle itself, as well as incorporating or interoperating with increasing numbers of devices that support mobile communications, entertainment and navigations systems, security systems, or the like in the automotive vehicle.

This growth in the amount of electronics content within an automotive vehicle has created a greater need in examining the impact of the electromagnetic emissions generated by those various electronics-based systems. Not only are these electromagnetic emissions significant in the context of the vehicle itself, but they are also significant in the context of their impact on systems that are external to the automotive vehicle. As would be appreciated, unchecked electromagnetic emissions generated by electronics within an automotive vehicle can negatively impact the operation of roadside equipment. This impact cannot be viewed from the perspective of a single automotive vehicle. Rather, this impact must be viewed in the context of a fleet of automotive vehicles that are operating on a road network.

Automotive vehicle manufacturers typically develop their own internal standards that enables them to manufacturer automotive vehicles that can meet the requirements of the various geographic markets in which their automotive vehicles are sold. These varying requirements can place a significant burden on the automotive vehicle manufacturers as they seek to reduce production costs for the various manufacturing components.

What is needed therefore is a mechanism that enables a manufacturer to flexibly tailor a solution to a particular set of emissions and noise requirements that are designed to limit the impact on on-board equipment as well as external equipment.

SUMMARY

A system and method for transmit signal pulse shaping in automotive applications, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
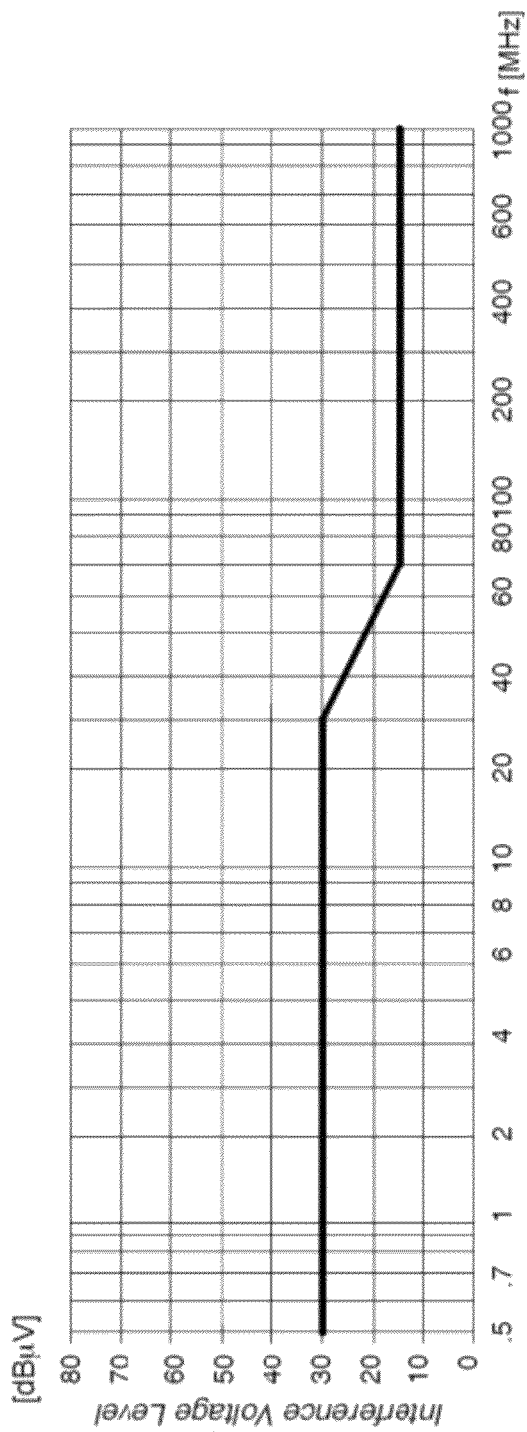
FIG. 1 illustrates an example of a emission requirement mask for an automotive application.

Data communication devices built for automotive vehicle applications are subject to meeting certain emission requirements. FIG. 1 illustrates an example of an emission requirement mask that can be used as a design guide in an automotive vehicle application. In general, the emission requirement mask defines an interference voltage level over a frequency spectrum. In the example of FIG. 1, the emission requirement mask defines a more restrictive interference voltage level in the higher frequency range as compared to the lower portion of the frequency spectrum.

Emission requirement masks that can be applied to a particular automotive vehicle system design can vary significantly. This can be due, for example, to the particular target geographical region in which the automotive vehicle will operate. As some geographical regions would require more restrictive emission requirements, a range of emission requirement masks can therefore result. As a practical matter, this range of emission requirement masks can lead to either an overly restrictive design that is applied to multiple geographic markets, or to multiple specialized designs that are individually targeted to particular geographic markets.

The design process for a given emission requirement mask can also encounter numerous challenges. More specifically, a physical layer device (PHY) that is designed for use in an automotive application can be called upon to support various types of installations represented by different manufacturers. For example, the different manufacturers can use different types of cabling (e.g., twisted pair, optical, etc.) to interconnect the electronic systems. As would be appreciated, emission control can be particularly important when a manufacturer decides to use unshielded copper cables.

Many additional factors beyond the geographic market and the type of cabling used can impact the emission requirements. For example, factors such as the automotive vehicle body design, the location of the cabling, and other electronic equipment used in the same automotive vehicle can impact the desired emission limits that are applied to a particular automotive vehicle. For these reasons, a single emission requirement mask is unlikely to be applied.

It is a feature of the present invention that the existence of multiple emission requirement masks can be accommodated by a flexible PHY design that can be configured to meet a particular emission requirement mask. This configurability enables a PHY design to be applied across multiple automotive vehicle manufacturers, as well as applied to multiple emission requirement design scenarios for a particular automotive vehicle manufacturer.

Figure 2:
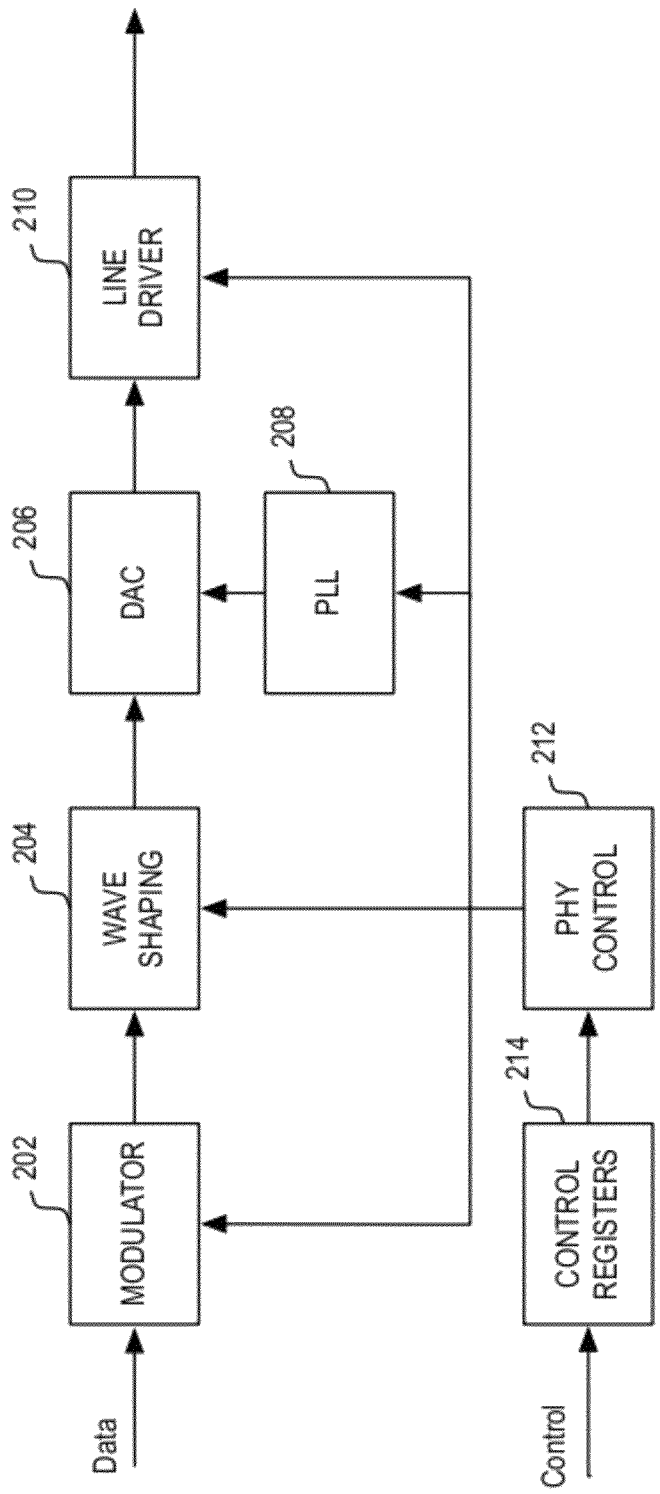
FIG. 2 illustrates an embodiment of a mechanism that enables programmable control of emissions and noise.

Reference is now made to FIG. 2, which illustrates an example of a PHY that enables programmable control of emissions and noise. As illustrated in FIG. 2, the PHY includes modulator 202 that modulates a carrier signal based on incoming data. In one embodiment, modulator 202 is a pulse amplitude modulation (PAM) modulator. In the present invention, modulator 202 can have the capability to operate at multiple transmit symbol rates, multiple transmit power levels, and multiple modulation levels.

The modulated signal generated by modulator 202 is passed to wave shaping module 204. To attain maximum noise immunity while reducing emission in higher frequency range, wave shaping module 204 generates a custom transmit signal that shapes the spectrum of the transmit signal to the emissions requirement mask. Here, it should be noted that without proper spectral shaping, the transmit signal level would have to be reduced to pass a particular emission mask. This flat power reduction would have significant limitations, however, when considering its impact on noise immunity and cable reach.

The custom transmit signal generated by wave shaping module 204 is passed to digital-to-analog converter (DAC), which passes the analog transmit signal to line driver 208 for transmission to receiver. As would be appreciated, the receiver can include a fixed/adaptive inverse filter corresponding to the wave shaping function to assist in the receiver's decision-point signal-to-noise ratio (SNR) optimization Wave shaping module 204 is designed to implement a particular wave shaping function that can shape the transmit signal as needed. In one example, the wave shaping function is represented by a programmable digital filter of the form:

$$F(z)=a+z^{-1}$$

Figure 3:
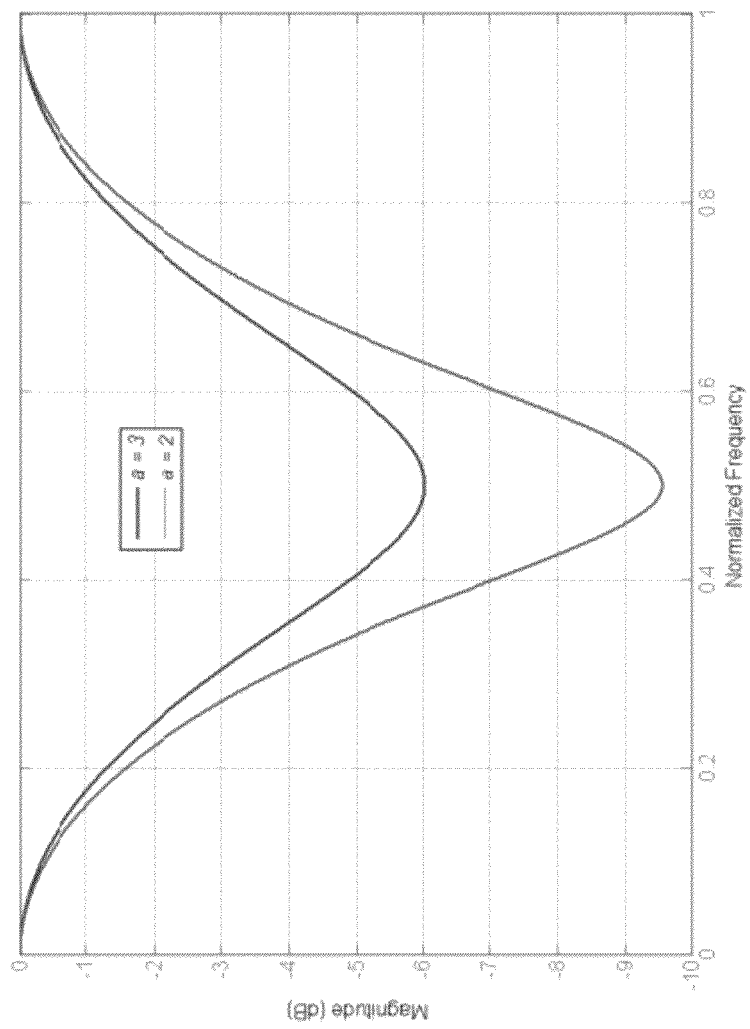
FIG. 3 illustrates an example of a wave shaping filter.

FIG. 3 illustrates the normalized frequency response for this filter for a=3 and a=2. As illustrated, the filter provides 6 dB or 9.5 dB rejection at the Nyquist frequency (i.e., half of the transmit symbol rate). Other wave shaping functions can be implemented by wave shaping module 204 as would be appreciated without departing from the scope of the present invention.

Figure 4:
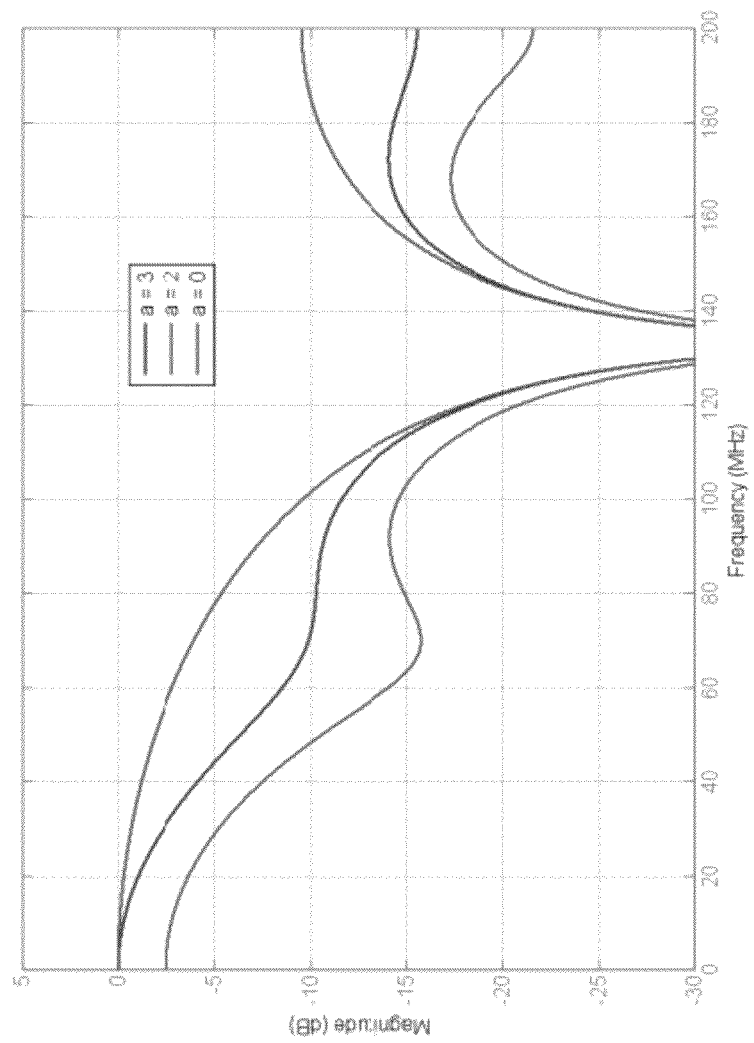
FIG. 4 illustrates an example of a normalized power spectral density using configurable wave shaping.

FIG. 4 shows the normalized power spectral density (PSD) for an example configuration. In this example, the symbol rate is 133.3 MHz and the PSD is shown for three selection of filter coefficients (i.e., a=0, 2, 3). For a =0 there is essentially no shaping applied through the digital filter. For a=2, 3, the Nyquist frequency at 66.7 MHz provides spectral shapes with better matching to the emission requirement mask such as that illustrated in FIG. 1.

As would be appreciated, further shaping of the PSD can be achieved by using analog filters either on chip or off chip. For example, passive filters that follow line driver 208 can be used on the board for a particular system data rate to allow further reduction of transmit PSD side lobes or edges of the main lobe if needed.

As further illustrated in FIG. 2, control of modulator module 202, wave shaping module 204, phase locked loop (PLL) 208, and line driver 210 is effected by PHY control 212. In the present invention, the control applied by PHY control 212 over modulator 202 and wave shaping module 204 enables a PHY design that can be configured to provide customized wave shaping to fit a particular emission requirement mask.

Here, it is recognized that the selection of a wave shaping function for application by wave shaping module 204 can be based on a selection of a fixed wave shaping function and/or a selection of one or more coefficients of a variable wave shaping function. The selection of a particular wave shaping function for application by wave shaping module 204 is based on control registers 214.

In general, control registers (e.g. non-volatile memory) can be designed to store parameters that can be used by PHY control 212. In the example of a PAM modulator, the stored parameters can be used by PHY control 212 to control a transmit symbol rate, a transmit signal level (or power) and PAM modulation type (and optionally coding) that is implemented by modulator module 202. The stored parameters can also be used by PHY control 212 in controlling wave shaping module 204. For example, the stored parameters can be used to select a particular wave shaping format (if more than one filter type is used) and wave shaping coefficients for a particular wave shaping format. Still further, the stored parameters can be used to configure PHY control 212. For example, the stored parameters can be used to direct the changes in configuration at the various stages of PHY control.

In combination, parameters stored in control registers 214 can be used by PHY control 212 to tailor a PHY to satisfy a particular emission requirements mask that is defined for a particular vehicle. As the optimum solution for one vehicle may not be the same as another vehicle, control registers 214 provide a look-up table based mechanism by which a PHY can be customized for the particular settings that are desired for a particular automotive vehicle for a particular automotive vehicle manufacturer.

Figure 5:
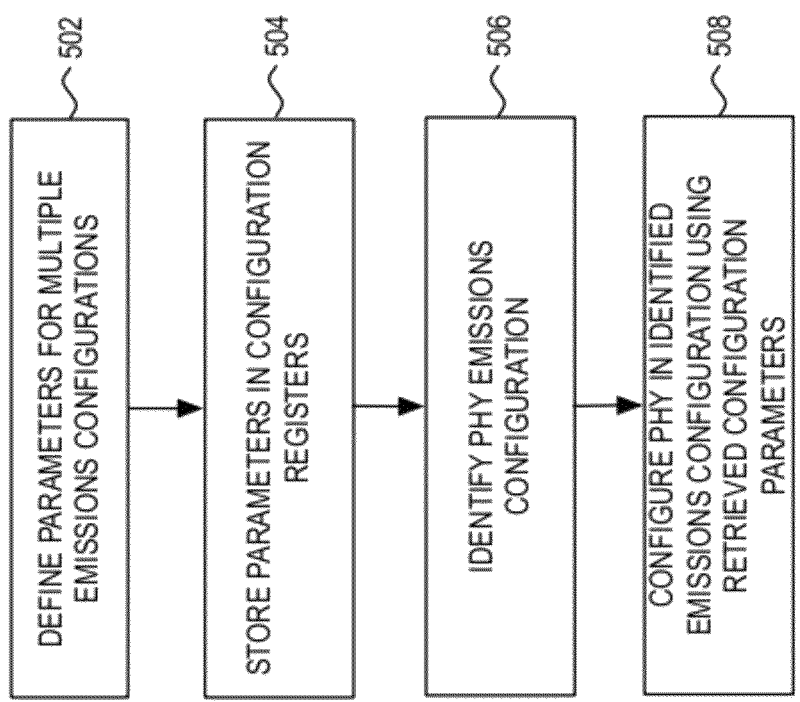
FIG. 5 illustrates a flowchart of a process of the present invention.

Having described an example implementation of a PHY that incorporates configurable wave shaping, reference is now made to the flowchart of FIG. 5, which illustrates an example process of the present invention. As illustrated, the process begins at step 502 where parameters are defined for multiple emissions configurations. In general, it is desirable to apply the multiple emissions configurations of a single PHY design to multiple emissions requirements masks used by an automotive vehicle manufacturer.

In one embodiment, each of the multiple emissions configurations are defined through the identification of a unique set of configurable parameter values. As noted above, the set of configurable parameters can include parameters that define the transmit symbol rate, the transmit signal level (or power), the modulation type (and optionally coding), the wave shaping format, the wave shaping coefficients, and the PHY control configuration. In a simple example, two different emissions configurations can be defined where a first emission configuration has a wave shaping coefficient having a first value (e.g., a=2), and a second emission configuration has a wave shaping coefficient having a second value (e.g., a=3).

In the process of step 502, a particular combination of configurable parameter values is defined to target each defined emissions requirement mask. The resulting multiple combinations of configurable parameter values would then be stored in the configuration registers accessible by the PHY at step 504. The storage of the configurable parameter values in the configuration registers would enable the PHY to be configurable for active operation in a particular emissions configuration.

More specifically, at step 506, the PHY control would identify a particular PHY emissions configuration that should be used by the PHY. In one embodiment, the identification of the particular PHY emissions configuration to be used can be based on a PHY control configuration parameter that identifies one of the set of emissions configurations that the automotive vehicle manufacturer desires to use in that application.

Based on such an identified PHY emissions configuration, the PHY control can then configure the PHY using the configuration parameters retrieved from the configurations registers. For example, the PHY control can configure the modulation module to operate at a specific transmit symbol rate, transmit signal level (or power), and modulation type (and optionally coding) based on the retrieved configuration parameters, and configure the wave shaping module to operate with a particular wave shaping format and wave shaping coefficients based on the retrieved configuration parameters.

As has been described, the configurability of the PHY to accommodate various emissions configurations provides significant flexibility to the automotive vehicle manufacturer in implementing an electronic communications component within a particular automotive vehicle. Such a design process is heavily dependent on the target geographical market as well as other electronic components to be included. As a design represents an evolutionary process, the provision of a flexible design tool enhances the ability of the automotive vehicle manufacturer to control the resulting emissions requirements of the automotive vehicle as a whole.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method in a physical layer device for controlling radiated emissions in a data network application in an automotive vehicle, comprising:
   retrieving, by a control module in said physical layer device, configuration parameters from a control register;
   configuring, by said control module, a transmit symbol rate and a transmit power level of a modulation module in said physical layer device based on said retrieved configuration parameters; and
   configuring, by said control module, a wave shaping function implemented by a wave shaping module in said physical layer device based on said retrieved configuration parameters, said wave shaping module applying said configured wave shaping function to a modulated signal generated by said modulation module at said configured transmit symbol rate and said configured transmit power level,
   wherein said configured wave shaping function as applied to said modulated signal reduces signal emissions when said wave shaped modulated signal is transmitted in a communication cable in said automotive vehicle.

2. The method of claim 1, wherein said modulation module has a pulse amplitude modulation capability.

3. The method of claim 1, wherein said parameters of said control register are defined based on signal emission requirements defined for said automotive vehicle.

4. The method of claim 1, wherein said wave shaping function is of the form $F(z) = a+z^{-1}$.

5. A physical layer device that controls radiated emissions in a data network application in an automotive vehicle, comprising:
   a modulation module designed to generate a modulated signal based on a data stream received by said modulation module;
   a wave shaping module that receives said modulated signal generated by said modulation module, said wave shaping module shaping said received modulated signal in accordance with a wave shaping function that is determined using a control signal; and
   a control module configured to generate said control signal, said control module generating said control signal in accordance with contents of a control register accessible by the physical layer device, said contents of said control register being used to configure said wave shaping function implemented by said wave shaping module to reduce signal emissions in a communication environment of said automotive vehicle.

6. The physical layer device of claim 5, wherein said modulation module has a pulse amplitude modulation capability.

7. The physical layer device of claim 5, wherein said modulation module has a capability of operating at multiple transmit symbol rates and multiple transmit power levels.

8. The physical layer device of claim 5, wherein said contents of said control register are defined based on signal emission requirements defined for said automotive vehicle.

9. The physical layer device of claim 5, wherein said wave shaping function is of the form $F(z)=a+z^{-1}$.

10. A method in a physical layer device for controlling radiated emissions in a data network application in an automotive vehicle, comprising:
    generating, by a modulation module in said physical layer device, a modulated signal based on a data stream received by said modulation module;
    shaping, by a wave shaping module in said physical layer device, said modulated signal to produced a wave shaped modulated signal, said shaping being based on a wave shaping function implemented by said wave shaping module; and
    transmitting, by said physical layer device, a signal based on said wave shaped modulated signal onto cabling contained in said automotive vehicle,
    wherein said transmission of said signal onto said cabling produces reduced emissions, said reduced emissions being based on a pre-configuration of a transmit symbol rate and a transmit power level of said modulation module and said wave shaping function of said wave shaping module, said pre-configuration being based on configuration parameters that are retrieved from a control register accessible by said physical layer device.

11. The method of claim 10, wherein said modulation module has a pulse amplitude modulation capability.

12. The method of claim 10, wherein said parameters of said control register are defined based on signal emission requirements defined for said automotive vehicle.

13. The method of claim 10, wherein said wave shaping function is of the form $F(z)=a+z^{-1}$.

* * * * *